March 6, 1956  W. L. ERNST  2,737,572
VAPORIZATION ACCELERATOR
Filed June 10, 1952  2 Sheets-Sheet 1
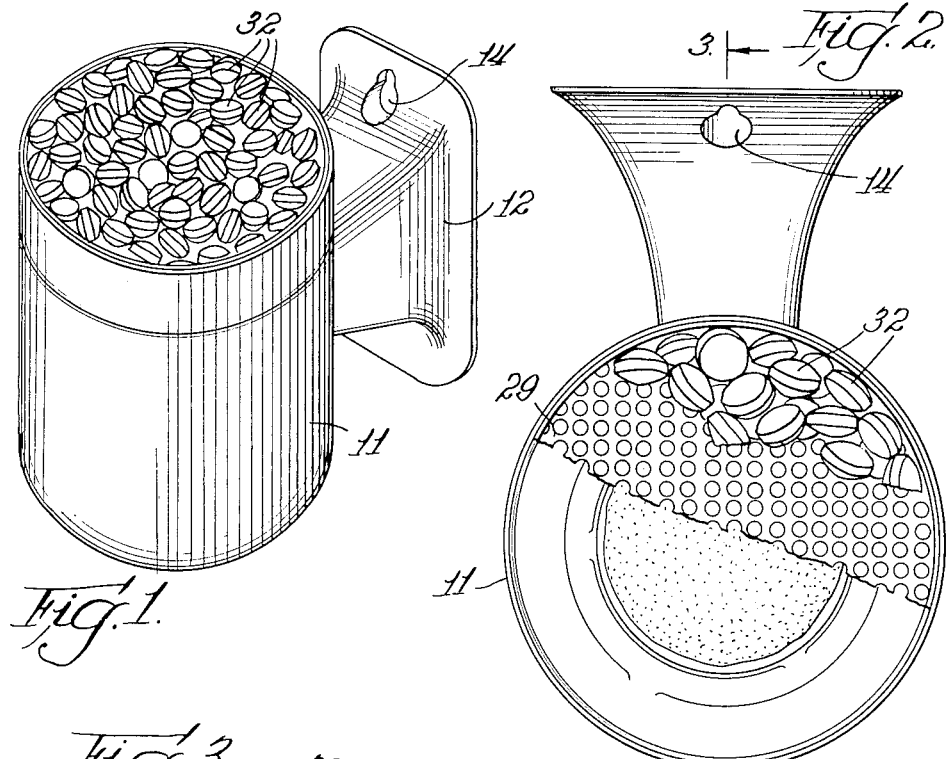
Fig. 1.
Fig. 2.
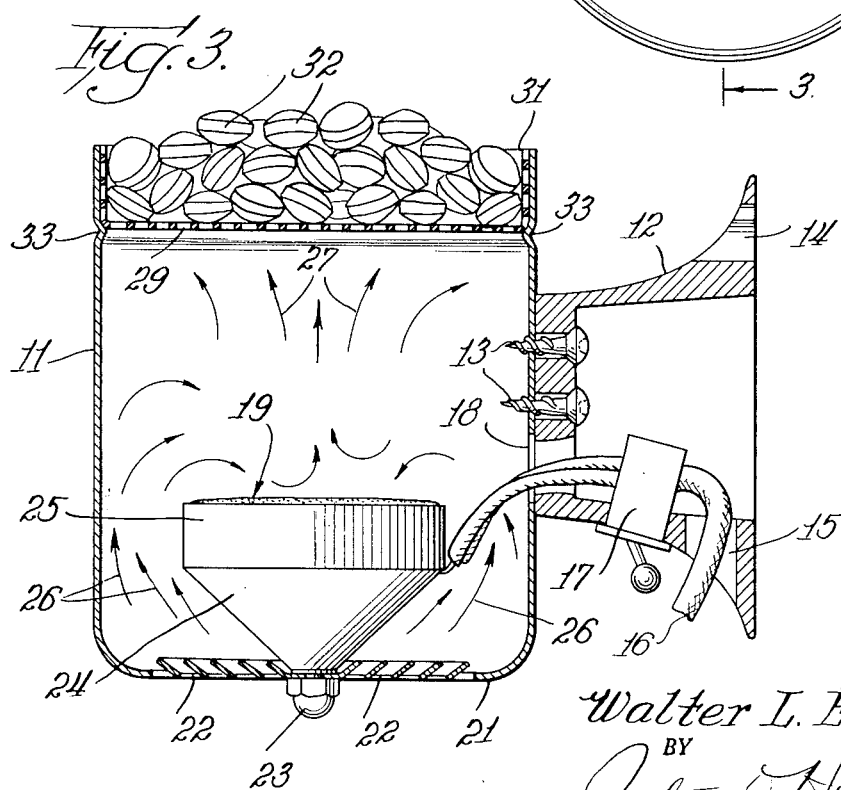
Fig. 3.
INVENTOR,
Walter L. Ernst
BY
Jaton Harbaugh
Atty.

March 6, 1956     W. L. ERNST     2,737,572
VAPORIZATION ACCELERATOR
Filed June 10, 1952     2 Sheets-Sheet 2
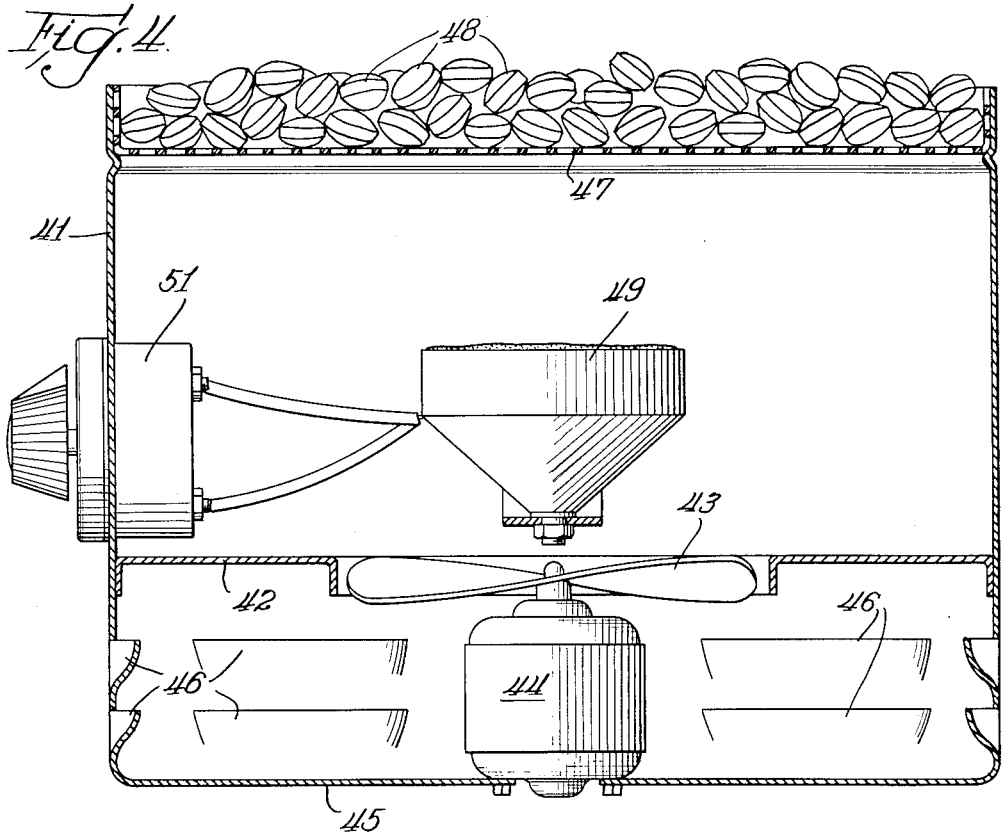
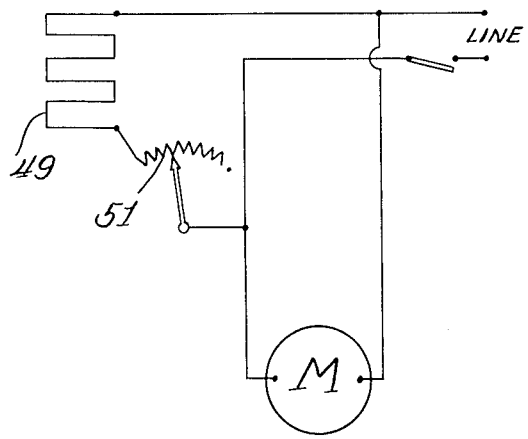
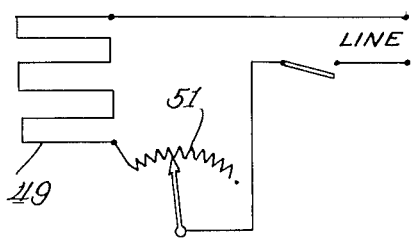
INVENTOR.
Walter L. Ernst
BY
Watson D Harbaugh
Atty.

United States Patent Office 2,737,572
Patented Mar. 6, 1956

2,737,572
VAPORIZATION ACCELERATOR

Walter L. Ernst, Ann Arbor, Mich., assignor, by direct and mesne assignments, to University Engineering Company, Detroit, Mich., a corporation of Michigan Application June 10, 1952, Serial No. 292,661

11 Claims. (Cl. 219—39)

The present invention relates to apparatus for accelerating vaporization in low volatility or sublimate chemicals such as benzene hexachloride, paradichlorobenzene, etc.

The gases which are liberated from certain evaporable solids when admixed with the atmosphere in certain concentrations constitutes an effective physiological insect killer without incurring any health hazard, irritation or distress condition to animal life or vegetation. In rooms of the order of 20,000 cubic feet, attended by average conditions of air exchange, vaporization from the gamma isomer of benzene hexachloride (Lindane) liberated at the rate of one gram per twenty-four hours has been determined adequate to effect total elimination of such common insect life as house flies, mosquitoes, etc., after three hours and without causing discomfort to humans.

In order to maintain effective concentration of Lindane, vaporization of this substance requires acceleration to a rate substantially above free vaporization as by the use of elevated temperatures, agitation or increased air flow.

Accelerated vaporization when induced by temperature alone has been observed to require such degrees of elevation as to approach and in some instances exceed the melting temperature of the chemical solids, causing them to flow together, particularly when in granular or globular form. As a further consequence of subjection to such elevations of temperature, supply charges of these chemicals are caused to flow together and become integrated into solid impenetrable masses. In this condition they possess high heat insulation properties so that as a consequence of continuous operation over extended periods of time such physical changes require still greater heat levels in order to produce given rates of evaporation.

Under other conditions of treatment, charge loads of the chemical substance are contained in basket type enclosures which are subjected to agitation or vibration. Such practices produce nerve irritating and distracting sounds. Also, as a consequence of agitation, the charges frequently become reduced to fine powdery consistency, causing them to escape their confinement while yet in solid form. This practice is therefore considered not only irritating to the nervous system, but wasteful and hazardous as well because while in this fine form, crystalling particles may be air borne over great distances and become deposited upon exposed articles of food producing injurious effects.

With these considerations in mind a principal object of the present invention therefore, is one of providing an effective and safe vapor disseminating apparatus which will diffuse sublimate medicinal, insecticidal or deodorant solids into atmosphere under conditions of steady supply concentrations without incurring any of the hazards of variation that are attended by known methods.

Another object of the present invention is to provide a system for evaporating sublimate solids in sufficient volume to effect adequate concentrations for habitable room spaces under conditions of operation which are economical costwise, free from nervous or sensory irritations and capable of sustaining their volume of production over extended periods of time.

Yet another object of the present invention is to produce an apparatus for effectively and efficiently evaporating and disseminating medicinal, insecticidal or deodorant solids having characteristics of sublimation so as to cause them to be diffused evenly throughout a living space or other enclosure which may not be conveniently sealed off but instead utilized under conditions of continual air change as through infiltration or forced ventilation.

For a better understanding of the herewith proposed improved methods of operation and of illustrative devices for carrying out this invention reference will now be had to the accompanying drawings and to the following detailed specification, in both of which like reference numerals designate corresponding parts throughout, and in which:

Fig. 1 is a perspective view of a wall mountable evaporating device having embodied therein certain principles of the invention;

Fig. 2 is a plan view with portions broken away of the apparatus illustrated in Fig. 1;

Fig. 3 is a transverse sectional view taken approximately on line 3—3 of Fig. 2;

Fig. 4 is a transverse sectional view of a modified form of apparatus embodying certain features of the present invention; and Figs. 5 and 6 are circuit diagrams illustrating the electrical connections such as may be employed with various forms of apparatus embodying features of the present invention.

In accordance with a preferred arrangement as illustrated in Figs. 1 through 3 a generally cylindrical outer container 11 is provided with a sidewardly extending attachment arm or fixture 12 with which it may be formed integrally or to which it may be secured as at 13 in permanent association. The attachment fixture 12 is preferably a hollow bracket having a flanged face in which is provided a keyhole aperture 14. Through this hole may be inserted the head of a bolt or screw which has been secured to a wall preferably in a central location with respect to the room or other space in which the device is to be operated.

In another aperture of the wall bracket 12 such as the one designated 15 there may be admitted a supply line cable 16 over which a source of domestic operating electric current is led through a control switch 17 and a still further communication aperture 18 in the bracket 12 as well as in a side wall of the cylindrical housing 11 to an inverted conical form of resistance or heater unit 19.

This arrangement makes it practical and convenient to mount the evaporating device on nearly any type of wall surface so as to be supplied with its requirement of operating current from any adjacent wall fixture or convenience outlet and not requiring elaborate structural changes.

In offices, hotel rooms, and other places where wall outlets are designed for the accommodation of wall-hung space heaters, electric fans or other such devices, this article may be suitably and appropriately mounted as a companion accessory and be supplied from the same outlet and wall mount accommodation without deterring from the efficiency or aesthetic decorations in noticeable degree. Because it operates under low heat level conditions this atmosphere treating device does not become involved with any fire hazard considerations nor with any excessive drainage upon the supply line of electric current, even when used continuously throughout the seasonal conditions in which its benefits are required or throughout the entire year as where desired for the control of all types of insect vermin.

The cylindrical housing 11 may have a closed bottom wall 21 apertured by discontinuous concentric circular incisions as at 22 so as to be provided with radial connecting strip portions. At the center of the bottom wall there is provided an opening through which there passes the mounting bolt of the heater element 19 securable thereto as by the means of a blind nut 23.

The heating element 19 is preferably a composite form of which the lower portion is an inverted squat conical section 24, and the upper portion a short length of cylinder 25. The louvers 22 in the bottom wall 21 are divergently offset or conical so that incoming air currents represented by the direction arrows 26 are guided outwardly as they range upwardly wiping against the surface of the heater element 19 and then tending to rise within the cylindrical space around the portion 25. Being at this time but partially heated they are immediately drawn inward to replace the fully heated air which rises from the region directly above the heater 19 as represented by the arrows 27. This produces a turbulence or rolling effect upon the replacing air currents which therefore becomes rapidly heated to a sufficient degree so that they become the air currents 27. After having become sufficiently heated they are caused to rise as a result of the chimney effect which is thus created.

Between the circumferential limits of the cylindrical section 25 and the side walls of the container 11 there will be observed to prevail a restricted area which is about equal cross sectionally to the area on the surface of heater 19. The space which intervenes between the cylindrical section of heater 19 and the bottom 29 of the perforated receptacle 31 becomes charged with a slight increasing pressure condition which thereupon forces the rising gases to percolate through the apertures in the bottom wall 29 and to weave between the interstices that exist between the pellets 32 that constitute the charge of evaporable chemical substance from which the insecticidal gas is generated.

Receptacle 31 is a shallow cylindrical dish, die-formed of densely perforated sheet stock and proportioned to fit snugly within a prearranged cylindrical space near the top of housing member 11 which is on that account scored by an encircling ridge 33 in order to limit the depth of insertion. The receptacle 31 may not require handling except after it has been freshly charged with a load of pellets. This ridge 33 serves to maintain accurately the established distance between the top surface of heater 19 and the bottom wall of receptacle 21 giving to the device a quality of consistent and stable heat generating characteristics suitable expressly for the dissemination of a particular type of salt or solid as for example, Lindane chlorophyl compositions or inhalants.

The heating element 19 is designed to draw from 10 to 50 watts in accordance with which the accumulated and average heat within the confined chamber of housing member 11 will range correspondingly between 50° and 75° C. This has been found to constitute an ideal operating range for chemical substances having the vaporization and melting point characteristics of Lindane. In its granular form Lindane will begin to soften at about 110° C., a temperature notably above that at which the most directly exposed parts of the charge in receptacle 31 are at any time subjected. Consequently, Lindane in pellet or granular form will under these operating conditions maintain itself sufficiently firm and solid to preserve the spacing interstices of original placement. After continuous use the percolating air currents will carry away the sublimated traces which flank the air current channels maintaining them open continuously and in some instances even enlarging them until the charge becomes dissipated.

A charge or single load of pellets 32 when disposed in the receptacle 31 and subjected to a period of vaporization under the limited heating conditions of the instant teachings may, after a period of time, be observed to undergo a condition of integration so that the total charge can thereafter be handled as a unit or even removed from the receptacle 31 as though it were an integral wafer. Nevertheless, there will be suffered no substantial flowing together of the chemical substance in a manner or to a degree which will obstruct the porosity of permeability of the mass. Accordingly, it is to be understood that vaporization can be carried on with constancy for long periods of time under the operation at least of two co-operating factors, one being the draft or air flow induced by the chimney effect and the other being the addition of limited heat for increasing vaporization. Because the porosity of the mass is thus reliably maintained or in some instances perceptibly increased the gradient of heat contribution sufficient for carrying out successful operation is thereby constant and the output of vapor is substantially constant under predetermined room conditions.

By supplying Lindane in pellet form as illustrated in the accompanying drawings in contradistinction to the usual fine granular crystals the apertures in receptacle 31 may be made considerably larger without incurring any risk of perceptible loss from sifting through or penetration. Moreover, by pressing or otherwise forming this chemical substance into standard dimensioned balls or pellets, the handling and filling of the vaporizer devices may be executed with greater ease, safety and rapidity. The recognized safe, yet effective concentration for insecticidal purposes is one gram per twenty-four hours for each 20,000 cubic feet of space. Periodic loads of charge may be reliably controlled by supplying pellets in weight-unit size and by then observing the total period of time which is required to dissipate a charge in terms of cubic capacity of the space to be treated.

For industrial use or under conditions of forced ventilation there may be required vapor generating units having larger storage capacity as well as forced volume capacity respecting heat as well as draft. For this reason a larger unit such as that indicated in Fig. 4 is contemplated in which the cylindrical housing 41 is partitioned by a horizontal baffle 42, centrally apertured and thereat containing a set of fan blades 43 driven by an electric motor 44. In such a device there may be provided, in addition to apertures in the bottom wall 45 (not shown), side wall cut out or louver sections 46, for the purpose of insuring that an adequate supply of replenishing air will under all conditions be forthcoming.

The velocity of the draft which is originated by the fan blades 43 will preferably be of such an order as to project the air currents forcibly through the perforations in the bottom wall 47, but yet not so great as to dislodge or even move the pellets 48 bodily, in order that it may not thereby create audible disturbance or vibration noises. With the air supply thus provided constituting a flow factor a condition of turbulence is produced in and around the heater 49 which causes the heat to be more evenly diffused than in the case of straight rising air columns. Under these conditions or operation it is sometimes desirable to regulate the vaporization output of the unit and toward this end the heater 49 is preferably regulated as by means of a rheostat 51, see also Figs. 5 and 6, throughout a range from zero current to an expected maximum heat producing current. In accordance with the wiring diagram, Fig. 6, it is suggested that a rheostat be employed to regulate the heat factor and thereby to constitute a mode of adjustment even in these cases where forced circulation is absent and where solely the chimney effect is relied upon for the purpose of draft supply. This mode of regulation is deemed to be adequately efficient and manifestly more economical than regulation of the air stream through the speed of the motor 44 although it is to be understood that this alternative mode of operation is within the contemplation of the present disclosure since vaporization does occur through air movement alone. The regulation and control of vapor gas output is notably of importance to successful operation of such devices because although not cumulative in its effect, Lindane gases in excess concentration may prove to be irritating and in substantial oversupply even toxic.

While the present invention has been explained and described with reference to certain illustrated embodiments and specifically described methods of operation, it will be understood, nevertheless, that numerous variations and modifications are susceptible of being incorporated without departure from the essential spirit or scope thereof. Accordingly, it is not intended to be limited in an understanding of this invention to the particular language em-

What is claimed is:

1. An apparatus for vaporizing sublimate solids which comprises, a housing member having a solid cylindrical outside wall formation and a bottom wall, said bottom wall having a plurality of circular louvers therein, a heating element supported on the center of said bottom wall, said heater element comprising a heater wire enclosed in a solid ceramic body which is sectionally of an inverted conical formation flaring upwardly and outwardly from said bottom wall, and a receptacle removably insertable within said housing in marginal contact around said housing member and formed of a sheet of perforated stock whose bottom is shaped to fit horizontally from wall to wall of said housing below the top of said housing member in spaced relation to said heater element with open space between said stock and heater.

2. The combination set forth in claim 1 in which said cylindrical side walls of said housing member includes a circumferential inset ridge for limiting the extent of insertion thereinto of said receptacle.

3. An apparatus for vaporizing sublimate solids by the combined effects of heat and convective air flow which comprises, a housing member having a single enclosing solid side wall formation and an attached bottom wall having openings therein, said side wall formation being substantially parallel and ending with a coextensive opening at its upper end, a heating element mounted within said member to the center of said bottom wall, said heater element comprising a heater encasing body portion of inverted conical formation flaring upwardly and outwardly from said bottom wall, and a receptacle removably insertable into said housing member at its upper opening and formed of sheet perforated stock shaped to fit the interior of said housing member.

4. The combination set forth in claim 3 in which said receptacle is a die formed cylindrical dish having a bottom wall which forms a total partition across the housing member and which is densely perforated so as to permit the air which enters said housing member through its said bottom wall openings to flow upward through said receptacle, and means for limiting the extent of insertion of said receptacle into said housing member.

5. An apparatus for vaporizing insecticidal solids which comprises a cylindrical housing member having an integral bottom wall provided with louver openings, a heater mounted within said housing member comprising an inverted conical section and a cylindrical section terminating in an upper ceramic surface covering a heating element, said conical and cylindrical sections being integrally associated with each other and said heater being mounted centrally of the bottom wall of said housing, a receptacle having a bottom wall and comprising a member insertable within said housing, means in said housing for limiting the depth of insertion of said receptacle, said receptacle having apertures in its bottom wall whereby incoming currents entering said housing through the louver openings are heated and directed as they flow around the inverted conical section of said heater and are caused to be drawn inwardly to replace gases heated by the top surface of said heater.

6. An apparatus for vaporizing chemical solids which comprises an outside housing member having a closed bottom wall provided with concentric circular openings, a ceramic covered heater disposed within said member and mounted centrally of said bottom wall, a receptacle comprising a secondary housing insertable within said principal housing and having a perforated bottom wall which extends across said principal housing, means for limiting the depth of insertion of said receptacle into said principal housing, whereby incoming currents entering said principal housing through the openings in its bottom wall are heated by said heater and drawn above the heater to replace hotter rising gases previously heated by said heater, said replacing movement of said currents producing symmetrical eddy turbulence and resulting in the mixing of incoming air currents intimately with previously disposed heated gases.

7. An apparatus for vaporizing sublimate solids which comprises a principal housing member including side and bottom wall enclosures defining a chamber, an intermediate horizontal partitioning element dividing the chamber into upper and lower subchambers, said partitioning element having a circular central aperture therein, a set of rotary fan blades adapted to be rotated within said aperture, an electric motor for rotating said fan blades, a heating element disposed above and spaced from said central aperture within the upper subchamber of said housing, said heater comprising an inverted conical section and a straight cylindrical section for directing outwardly gases projecting thereupon by said fan blades from the lower subchamber, and a rheostat electrically connected with said heater for regulating the input voltage applied to said heater.

8. An apparatus for accelerating vaporization which comprises a principal housing member defining a main chamber divided horizontally into upper and lower subchambers, a set of rotary fan blades for directing gas flow from the lower to the upper of said subchambers, an electric motor for rotating said fan blades, a heater comprising an inverted conical section and a straight cylindrical section for directing outwardly gases projected thereupon by said fan blades from the lower subchamber, and a rheostat electrically connected between a source of voltage and said heater for regulating with said heater in cooperation with said blades, the flow of heated gases projected upwardly through said housing.

9. The combination set forth in claim 8 including a receptacle inserted at an upper level of said housing having a perforated bottom wall, said receptacle adapted to contain a layer of sublimate material formed into pellets, said wall and layer providing finely divided interstices through which heated air may be directed whereby the total influences of evaporation of said pellets may be regulated by adjusting the heating characteristics of said heater.

10. A method of diffusing the vapors from sublimate solids which comprises the steps of supporting a layer of the solids in globular pellets on a porous base over a vertical passage, projecting an upwardly rising current through said passage for a distance greatly in excess of the thickness of said layer for permeating said base and its supported solids, and augmenting the vaporization effects of said rising current by constricting said current over a portion of said distance and variably heating the gases of said current at and above said constriction whereby to regulate the total vaporization effects produced upon the solids.

11. A method of regulating vaporization from sublimate solids which comprises the steps of supporting a layer of the solids formed into globular pellets on a porous base over a vertical passage, impelling an upwardly rising current through said passage for a distance greatly in excess of the thickness of said layer and through said base and supported solids, and turbulating and heating said current variably betwen 50° and 75° C. whereby to regulate the total vaporization effects produced upon said solids at a temperature below the melting point of said solids.

References Cited in the file of this patent

UNITED STATES PATENTS

| | | |
|---|---|---|
| 1,694,175 | Hauser | Dec. 4, 1928 |
| 1,973,347 | Kelly | Sept. 11, 1934 |
| 1,990,338 | Lippert | Feb. 5, 1935 |
| 2,005,501 | Kelly | June 18, 1935 |
| 2,495,419 | Peterson | Jan. 24, 1950 |
| 2,611,068 | Wellens | Sept. 16, 1952 |